(12) United States Patent  (10) Patent No.: US 8,975,848 B2
Chretien et al.  (45) Date of Patent: Mar. 10, 2015

(54) METHODS AND SYSTEMS FOR STARTING AN ELECTRIC MOTOR

(71) Applicant: Regal Beloit America, Inc., Beloit, WI (US)

(72) Inventors: Ludovic Andre Chretien, Columbia City, IN (US); Brian L. Beifus, Fort Wayne, IN (US)

(73) Assignee: Regal Beloit America, Inc., Beloit, WI (US)

(*) Notice: Subject to any disclaimer, the term of this patent is extended or adjusted under 35 U.S.C. 154(b) by 179 days.

(21) Appl. No.: 13/832,893

(22) Filed: Mar. 15, 2013

(65) Prior Publication Data

US 2014/0265974 A1  Sep. 18, 2014

(51) Int. Cl.
*H02P 1/16* (2006.01)

(52) U.S. Cl.
CPC .................................. *H02P 1/16* (2013.01)
USPC .............. 318/400.3; 318/400.13; 318/400.11; 318/400.33; 318/711; 318/369

(58) Field of Classification Search
USPC ............... 318/400.3, 400.11, 400.13, 400.33, 318/711, 369
See application file for complete search history.

(56) References Cited

U.S. PATENT DOCUMENTS

| | | | | |
|---|---|---|---|---|
| 4,713,594 A | * | 12/1987 | Bose et al. | 318/685 |
| 4,985,666 A | * | 1/1991 | Nakabayashi | 318/434 |
| 5,097,378 A | | 3/1992 | Nakabayashi | |
| 5,150,264 A | | 9/1992 | Nakabayashi | |
| 5,717,298 A | * | 2/1998 | Tang et al. | 318/400.11 |
| 6,038,500 A | | 3/2000 | Weiss | |
| 6,078,156 A | * | 6/2000 | Spurr | 318/368 |
| 7,293,761 B2 | | 11/2007 | Malek et al. | |
| 7,535,210 B2 | * | 5/2009 | Wang | 323/282 |
| 7,723,937 B2 | * | 5/2010 | Kurosawa et al. | 318/400.34 |
| 2007/0296372 A1 | * | 12/2007 | Hori et al. | 318/716 |
| 2010/0125383 A1 | | 5/2010 | Caouette | |
| 2012/0303251 A1 | * | 11/2012 | Shimizu | 701/113 |

\* cited by examiner

*Primary Examiner* — Rita Leykin
(74) *Attorney, Agent, or Firm* — Armstrong Teasdale LLP

(57) ABSTRACT

Methods and systems for starting an electric motor using a motor controller including a processor are provided. The method includes determining if the electric motor is operating, increasing a failed start counter if the electric motor is determined not to be operating, determining a reverse rotation by comparing a failed start counter to a predetermined threshold, and applying a reverse rotation start routine to the electric motor when a reverse rotation is determined.

23 Claims, 4 Drawing Sheets

METHODS AND SYSTEMS FOR STARTING AN ELECTRIC MOTOR

BACKGROUND

The embodiments described herein relate generally to motors, and more particularly, to methods and systems for starting an electric motor.

Electric motors are used in a variety of systems operating in a variety of industries. One such use of electric motors is the inclusion of electric motors into power products such as fans used in heating, ventilation and air conditioning systems (HVAC). Generally, fans may include a plurality of electric motors that are configured to start at different times according to system protocols. Starting delays between the plurality of motors can create a windmilling effect or reverse rotation of a fan and motor due to a backpressure placed on the fan. This reverse rotation may create a load with large inertia that can become too large to be overcome by a normal start procedure of a motor.

BRIEF DESCRIPTION

In one aspect, a method for starting an electric motor using a motor controller including a processor is provided. The method includes determining if the electric motor is operating, increasing a failed start counter if the electric motor is determined not to be operating, determining a reverse rotation by comparing a failed start counter to a predetermined fixed or configurable threshold, and applying a reverse rotation start routine to the electric motor when a reverse rotation is determined.

In another aspect, a controller assembly coupled to an electric motor is provided. The controller assembly is configured to determine if the electric motor is operating, increase a failed start counter if the electric motor is determined not to be operating, determine a reverse rotation by comparing a failed start counter to a predetermined fixed or configurable threshold, and apply a reverse rotation start routine to the electric motor when a reverse rotation is determined.

In a further aspect, an electric motor system including an electric motor and a controller assembly coupled to the electric motor is provided. The controller assembly is configured to determine if the electric motor is operating, increase a failed start counter if the electric motor is determined not to be operating, determine a reverse rotation by comparing a failed start counter to a predetermined fixed or configurable threshold, and apply a reverse rotation start routine to the electric motor when a reverse rotation is determined.

In another aspect, a method for starting an electric motor using a motor controller including a processor is provided. The method includes determining the motor is rotating backwards, determining an estimated motor position, and forcing an offset of the estimated motor position based on the determined estimated motor position.

DETAILED DESCRIPTION

Figure 1:
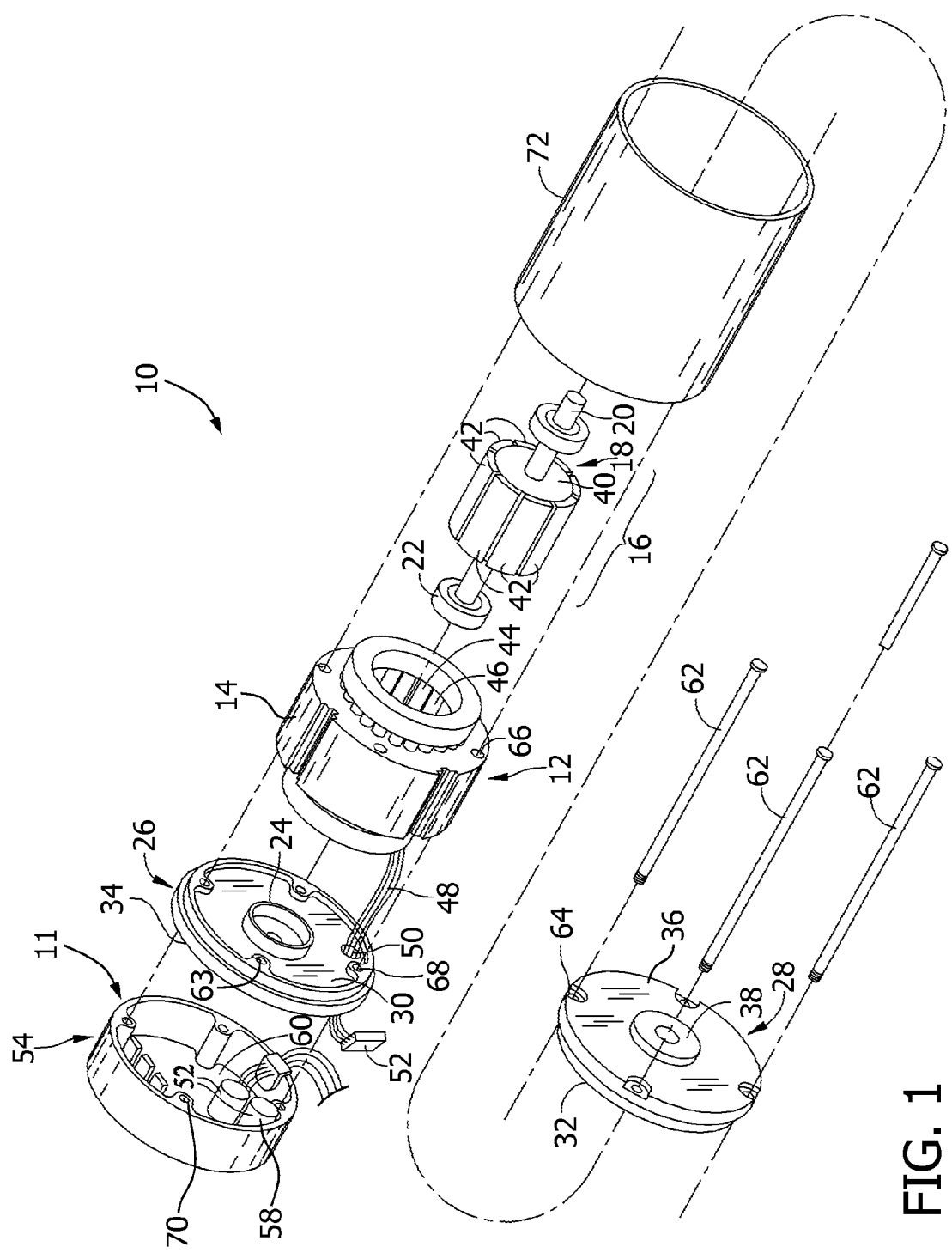
FIG. 1 is an exploded view of an exemplary motor.

FIG. 1 is an exploded view of an exemplary motor 10. Motor 10 includes a stationary assembly 12 including a stator or core 14 and a rotatable assembly 16 including a permanent magnet rotor 18 and a shaft 20. In the exemplary embodiment, motor 10 is used in a heating, ventilating and air conditioning system (not shown).

Rotor 18 is mounted on and keyed to shaft 20 journaled for rotation in conventional bearings 22. Bearings 22 are mounted in bearing supports 24 integral with a first end member 26 and a second end member 28. End member 26 has an inner facing side 30 and end member 26 has an inner facing side 32. Likewise, end member 28 has an inner facing side 30 and end member 26 has an inner facing side 32. Stationary assembly 12 and rotatable assembly 16 are located between sides 30 and 32.

End member 26 has an outer side 34 and end member 26 has an outer side 36. Similarly, end member 28 has an outer side 34 and end member 28 has an outer side 36. Outer sides 34 and 36 are opposite inner sides 30 and 32 respectively. Additionally, second end member 28 includes an aperture 38 for shaft 20 to extend through outer side 34.

Rotor 18 comprises a ferromagnetic core 40 and is rotatable within stator 14. Segments 42 of permanent magnet material, each providing a relatively constant flux field, are secured, for example, by adhesive bonding to rotor core 40. Segments 42 are magnetized to be polarized radially in relation to rotor core 40 with adjacent segments 42 being alternately polarized as indicated. While magnets on rotor 18 are illustrated for purposes of disclosure, it is contemplated that other rotors having different constructions and other magnets different in both number, construction, and flux fields may be utilized with such other rotors within the scope of the invention.

Stationary assembly 12 comprises a plurality of winding stages 44 adapted to be electrically energized to generate an electromagnetic field. Stages 44 are coils of wire wound around teeth 46 of laminated stator core 14. Winding terminal leads 48 are brought out through an aperture 50 in first end member 26 terminating in a connector 52. While stationary assembly 12 is illustrated for purposes of disclosure, it is contemplated that other stationary assemblies of various other constructions having different shapes and with different number of teeth may be utilized within the scope of the invention.

Motor 10 further includes an enclosure 54 which mounts on the rear portion of motor 10. Control system 11 includes a plurality of electronic components 58 and a connector (not shown) mounted on a component board 60, such as a printed circuit board. Control system 11 is connected to winding stages 44 by interconnecting connector 52. Control system 11 applies a voltage to one or more of winding stages 44 at a time for commutating winding stages 44 in a preselected sequence to rotate rotatable assembly 16 about an axis of rotation.

Connecting elements 62 include a plurality of bolts that pass through bolt holes 64 in second end member 28, bolt holes 66 in core 14, bolt holes 68 in first end member 26, and bolt holes 70 in enclosure 44. Connecting elements 62 are adapted to urge second end member 28 and enclosure 44 toward each other thereby supporting first end member 26, stationary assembly 12, and rotatable assembly 16 therebetween. Additionally, a housing 72 is positioned between first end member 26 and second end member 28 to facilitate enclosing and protecting stationary assembly 12 and rotatable assembly 16.

Motor 10 may include any even number of rotor poles and the number of stator poles are a multiple of the number of rotor poles. For example, the number of stator poles may be based on the number of phases. In one embodiment (not shown), a three-phase motor 10 includes six rotor pole pairs and stator poles. In one embodiment, motor 10 is a brushless DC motor having a known classification of a "56 Frame 3 Hp" motor, which is a three-phase motor.

Figure 2:
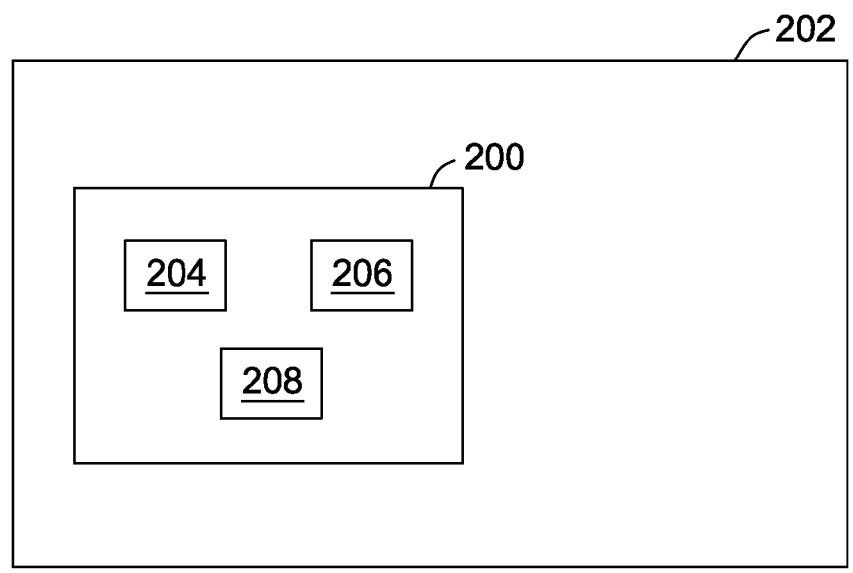
FIG. 2 is a schematic diagram of an exemplary motor controller for use with the motor shown in FIG. 1.

FIG. 2 is a schematic diagram of an exemplary motor controller 200 for use with a motor 202, such as motor 10 (shown in FIG. 1). In the exemplary embodiment, motor controller 200 is an integrated component of motor 202, such as control system 11. Alternatively, motor controller 200 can be configured to communicatively couple to motor 202 such that motor controller 200 is not integrated into motor 202. In one embodiment, motor controller 200 may control any number of motors as described herein. In the exemplary embodiment, motor 202 is utilized as fan and/or blower motor in a fluid (e.g., water, air, etc.) moving system. For example, motor 202 may be utilized in a clean room filtering system, a fan filter unit, a variable air volume system, a refrigeration system, a furnace system, an air conditioning system, and/or a residential or commercial heating, ventilation, and air conditioning (HVAC) system. Alternatively, motor 202 may be implemented in any application that enables electric motor controller 200 to function as described herein.

Motor controller 200 controls motor 202 by transmitting a command signal to components of motor 202. In the exemplary embodiment, the command signal is one or more high-voltage and high frequency pulses. Motor controller 200 includes at least one memory device 204 and a processor 206 that is communicatively coupled to memory device 204 for executing instructions. In one embodiment, memory device 204 and processor 206 are integrated into a single unit. In some embodiments, executable instructions are stored in memory device 204. In the exemplary embodiment, motor controller 200 performs one or more operations described herein by programming processor 206. For example, processor 206 may be programmed by encoding an operation as one or more executable instructions and by providing the executable instructions in memory device 204. Motor controller also includes an input/output unit 208 that enables input and output of data with other components within motor 202 and/or devices that may be connected to motor controller 200. In one embodiment, input/output unit 208 may provide a connection for user input through a user input device.

In the exemplary embodiment, memory device 204 is one or more devices that enable information such as executable instructions and/or other data to be stored and retrieved. Memory device 204 may include one or more computer readable media, such as, without limitation, dynamic random access memory (DRAM), static random access memory (SRAM), a solid state disk, and/or a hard disk. Memory device 204 may be configured to store, without limitation, application source code, application object code, source code portions of interest, object code portions of interest, configuration data, execution events and/or any other type of data. In the exemplary embodiment, memory device 204 includes firmware and/or initial configuration data for motor controller 200.

Processor 206 may include one or more processing units (e.g., in a multi-core configuration). Further, processor 206 may be implemented using one or more heterogeneous processor systems in which a main processor is present with secondary processors on a single chip. Alternatively, processor 206 may be a symmetric multi-processor system containing multiple processors of the same type. Further, processor 206 may be implemented using any suitable programmable circuit including one or more systems and microcontrollers, microprocessors, reduced instruction set circuits (RISC), application specific integrated circuits (ASIC), programmable logic circuits, field programmable gate arrays (FPGA), and any other circuit capable of executing the functions described herein. In the exemplary embodiment, processor 206 controls operation of motor controller 200.

Figure 3:
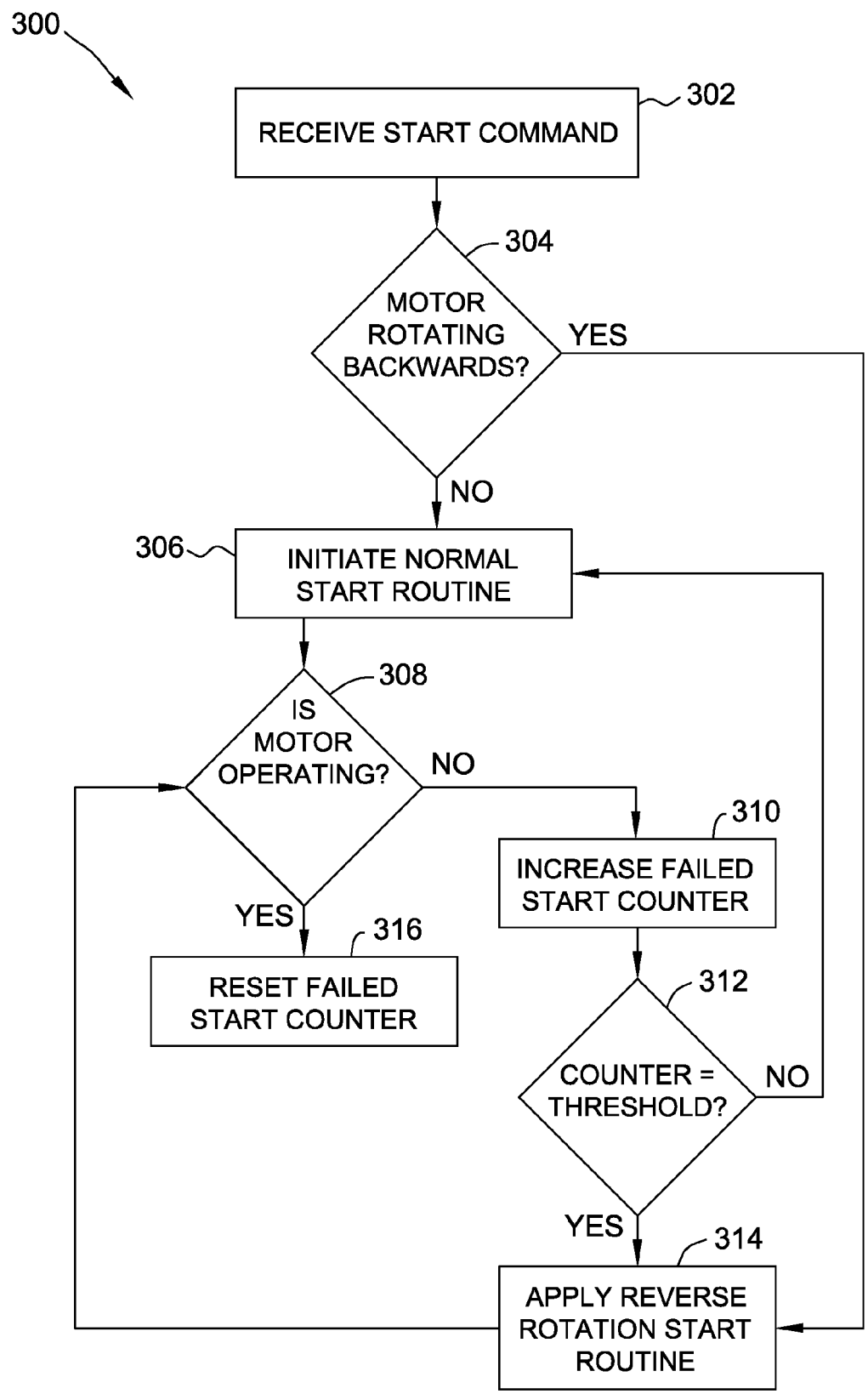
FIG. 3 is flowchart of an exemplary method for starting the electric motor shown in FIG. 2.

FIG. 3 is flowchart of an exemplary method 300 for starting electric motor 202 (shown in FIG. 2). In the exemplary embodiment, motor 202 and/or controller 200 receives 302 a start command for motor 202 to begin operating. In one embodiment, the start command is received from a controller of an HVAC system. Alternatively, the start command can be sent from any system and/or location that facilitates starting an electric motor as described herein. In the exemplary embodiment, after receiving 302 the start command, controller 200 determines 304 if motor 202 is rotating backwards using known techniques. If controller cannot determine 304 that motor 202 is rotating backwards, controller 200 initiates 306 a normal start routine for motor 202.

In the exemplary embodiment, after initiating 306 a normal start routine, controller 200 determines 308 if motor 202 has started and is operating. In one embodiment, controller 200 waits a predetermined amount of time after initiating 306 the normal start routine. The predetermined amount of time can be any amount of time that facilitates starting a motor as described herein, including but not limited to 5-30 seconds. In one embodiment, controller 200 determines 308 if motor 202 is operating by comparing the operating RPMs of motor 202 to a predetermined RPM threshold. In the exemplary embodiment, the predetermined RPM threshold is 100 RPMs. However, the predetermined RPM threshold can be any user selected value that facilitates starting a motor as described herein. If controller 200 determines 308 that motor 202 is not operating, a failed start counter is increased 310. In the exemplary embodiment, the failed start counter tracks a number of failed starts of motor 202 and is stored on memory device 204.

After the failed start counter is increased 310, controller 200 determines 312 if motor 202 is operating in reverse rotation. The reverse rotation is determined 312 by processor 206 comparing the failed start counter to a failed start threshold to determine if the failed start counter equals and/or exceeds the failed start threshold. In one embodiment, the failed start threshold is user defined and stored on memory device 204. The failed start threshold can be any value based on the requirements of a user and/or a related system, (e.g., an HVAC system).

If the failed start counter does not equal and/or exceed the failed start threshold, the normal start routine is initiated 306 again and the process loop continues until motor 202 is determined 308 to be operating or the failed start counter equals and/or exceeds the failed start threshold such that reverse rotation is determined 312. When reverse rotation is determined 312, controller 200 applies and/or initiates 314 a reverse rotation start routine. Additionally, as shown in FIG. 3, if a determination is made 304 that motor 202 is rotating backwards, controller 200 applies and/or initiates 314 a reverse rotation start routine at that point. The reverse rotation start routine includes braking of motor 202 and increasing a torque and acceleration. In this embodiment, braking is achieved by controller short circuiting windings (e.g. winding stages 44 shown in FIG. 1). In one embodiment, the reverse rotation start routine brakes the motor, and increases the torque and acceleration of the normal start routine by a predetermined amount or percentage. In another embodiment, the reverse rotation start routine utilizes a last known start routine, brakes the motor, and increases the torque and acceleration for that start routine a predetermined amount or percentage. In yet another embodiment, the reverse rotation start routine brakes rotation of the motor and applies and/or initiates the normal start routine.

In the exemplary embodiment, after the reverse rotation start routine is applied and/or initiated 314, controller 200 determines 308 if motor 202 is operating. If motor 202 is determined 308 to be operating, the failed start counter is reset 316. If motor 202 is not determined 308 to be operating, the process loop continues until operation of motor 202 is determined 308.

Figure 4:
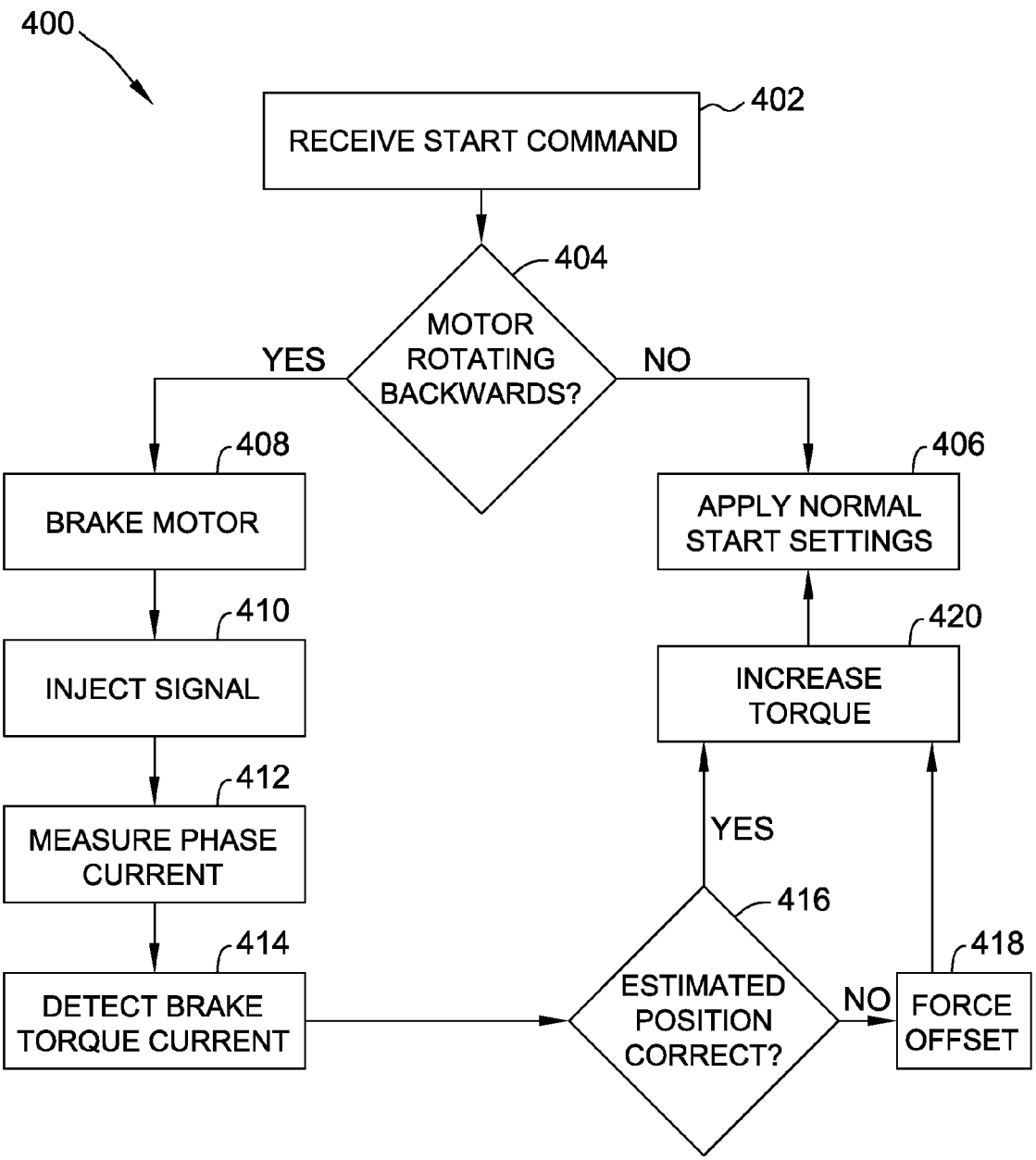
FIG. 4 is flowchart of an alternative method for starting the electric motor shown in FIG. 2.

FIG. 4 is flowchart of an exemplary method 400 for starting electric motor 202 (shown in FIG. 2). In one embodiment, method 400 is utilized with 2-quadrant motors that do not have the regenerative capacity of 4-quadrant motors. In the exemplary embodiment, motor 202 and/or controller 200 receives 402 a start command for motor 202 to begin operating. In one embodiment, the start command is received from a controller of an HVAC system. Alternatively, the start command can be sent from any system and/or location that facilitates starting an electric motor as described herein. In the exemplary embodiment, after receiving 402 the start command, controller 200 determines 404 if motor 202 is rotating backwards using known techniques. If controller cannot determine 404 that motor 202 is rotating backwards, controller 200 initiates 406 a normal start routine for motor 202.

If controller determines 404 that motor 202 is rotating backwards, controller 200 brakes 408 rotation of motor 202. Braking 408 is achieved by controller short circuiting windings (e.g. winding stages 44 shown in FIG. 1). Controller 200 then injects 410 a high frequency signal into the windings. Using the high frequency signal, a motor phase current is measured 412. In this embodiment, controller 200 detects 414 a polarity of the current creating braking torque.

The measured 412 motor phase current is compared to the detected 414 polarity of the current creating braking torque to determine 416 an estimated motor position. If the motor position is determined 416 to have an incorrect estimated motor position due to the comparison of the measured 412 motor phase current and the detected 414 polarity of the current creating braking torque, controller 200 forces 418 a 180° offset on the estimated motor electrical position to provide a correct motor position. The 180° offset ensures that motor 202 is started in a correct direction of rotation. After the 180° offset is forced 418, a predetermined amount of torque is applied 420 to motor 202 and the normal start settings are initiated 406. In one embodiment, the predetermined amount of torque is applied 420 by utilizing the normal start settings and increasing the torque of such settings a predetermined amount or percentage.

The embodiments described herein provide systems and methods for starting an electric motor that may be operating in a reverse rotation. The embodiments facilitate overcoming a load creating backwards rotation that may be placed on a fan and/or motor that may prevent a motor from starting using a normal start routine. The systems and methods described herein enable a motor to distinguish between reverse rotation and a standstill state that can often be hard to estimate, measure, and/or observe at low RPMs. The embodiments described herein also enable a controller to detect reverse rotation without the use of position sensors, which reduces cost of production and increases reliability of the systems.

Exemplary embodiments of the control system and methods of controlling power to the electric motor are described above in detail. The control system and methods are not limited to the specific embodiments described herein, but rather, components of the control system and/or the motor and/or steps of the method may be utilized independently and separately from other components and/or steps described herein. For example, the control system and methods may also be used in combination with other power systems and methods, and are not limited to practice with only the HVAC system as described herein. Rather, the exemplary embodiments can be implemented and utilized in connection with many other system applications or other support.

A technical effect of the system described herein includes at least one of: a.) determining if an electric motor is operating, b.) increasing a failed start counter if the electric motor is determined not to be operating, c.) determining a reverse rotation by comparing a failed start counter to a predetermined threshold, and d.) applying a reverse rotation start routine to the electric motor when a reverse rotation is determined.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any layers or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for starting an electric motor using a motor controller including a processor, said method comprising:
   determining if the electric motor is operating;
   increasing a failed start counter if the electric motor is determined not to be operating;
   determining a reverse rotation by comparing the failed start counter to a predetermined threshold; and
   applying a reverse rotation start routine to the electric motor when the reverse rotation is determined.

2. The method of claim 1, wherein applying a reverse rotation start routine includes braking rotation of the electric motor.

3. The method of claim 1, wherein applying a reverse rotation start routine includes increasing at least one of a torque and an acceleration of a normal motor start routine.

4. The method of claim 1, wherein applying a reverse rotation start routine includes braking rotation of the electric motor and increasing at least one of a torque and an acceleration of a last known start routine.

5. The method of claim 1, further comprising resetting the failed start counter if the motor is determined to be operating.

6. The method of claim 1, further comprising initiating a normal motor start routine before determining if the electric motor is operating.

7. The method of claim 6, wherein determining if the electric motor is operating includes waiting a pre-determined time after initiating a normal motor start routine before determining if the electric motor is operating.

8. The method of claim 1, further comprising initiating a normal motor start routine if a reverse rotation is not determined.

9. A controller assembly coupled to an electric motor and configured to:
   determine if the electric motor is operating;
   increase a failed start counter if the electric motor is determined not to be operating;

determine a reverse rotation by comparing a failed start counter to a predetermined threshold; and apply a reverse rotation start routine to the electric motor when a reverse rotation is determined.

10. The controller assembly of claim 9, wherein said controller assembly is further configured to brake rotation of the electric motor.

11. The controller assembly of claim 10, wherein said controller assembly is further configured to initiate a normal start routine after applying the reverse rotation start routine.

12. The controller assembly of claim 9, wherein said controller assembly is further configured to brake rotation of the electric motor and increase at least one of a torque and an acceleration of a last known start routine.

13. The controller assembly of claim 9, wherein said controller assembly is further configured to reset the failed start counter if the motor is determined to be operating.

14. The controller assembly of claim 9, wherein said controller assembly is further configured to initiate a normal motor start routine and wait a pre-determined time after initiating a normal motor start routine before determining if the electric motor is operating.

15. The controller assembly of claim 9, wherein said controller assembly is further configured to initiate a normal motor start routine if a reverse rotation is not determined.

16. An electric motor system comprising:
an electric motor; and
a controller assembly coupled to the electric motor and configured to:
  determine if the electric motor is operating;
  increase a failed start counter if the electric motor is determined not to be operating;
  determine a reverse rotation by comparing the failed start counter to a predetermined threshold; and
  apply a reverse rotation start routine to the electric motor when the reverse rotation is determined.

17. The electric motor system of claim 16, wherein said controller assembly is further configured to brake rotation of the electric motor.

18. The electric motor system of claim 16, wherein said controller assembly is further configured to increase at least one of a torque and an acceleration of a normal motor start routine.

19. The electric motor system of claim 16, wherein said controller assembly is further configured to brake rotation of the electric motor and increase at least one of a torque and an acceleration of a last known start routine.

20. A method for starting an electric motor using a motor controller including a processor, said method comprising:
determining if the motor is rotating backwards;
determining an estimated motor position using a signal injection; and
forcing an offset of the estimated motor position based at least on one of the determined estimated motor position and the motor phase current.

21. The method of claim 20, wherein determining an estimated motor position comprises comparing a measured motor phase current to a detected polarity of a current creating braking torque.

22. The method of claim 20, further comprising applying additional torque to a normal start routine if the motor is determined to be rotating backwards.

23. The method of claim 20, wherein forcing an offset of the estimated motor position comprises forcing a 180° offset of the initial estimated motor electrical position.

* * * * *